Patented Sept. 5, 1950

2,520,919

UNITED STATES PATENT OFFICE 2,520,919

ACRYLIC RESIN AND VINYL COPOLYMER COMPOSITIONS

Andrew R. Forgie, Sparta, N. J., assignor to Doremus-Passaic Realty Corporation, Newark, N. J., a corporation of New Jersey No Drawing. Application May 1, 1945, Serial No. 591,413

3 Claims. (Cl. 260—45.5)

This invention relates to novel compositions of matter and to methods for preparing and applying the same. More particularly, the invention is directed to novel coating compositions and to methods for preparing and applying them. In one of its more specific aspects the invention is directed to novel one time use coatings which have good adhesion properties on the surface coated therewith, good tensile strength, good weatherproofing and waterproofing characteristics and if desired may be peeled off the surface coated therewith.

According to this invention, there are provided novel compositions which may be applied either hot or cold and preferably hot to provide a coating of any desired reasonable thickness and having the aforementioned characteristics. These novel compositions may be applied as coatings to hermetically seal containers composed of cardboard, paper, glass, metal, cloth, wood, natural or synthetic resins or the like. These novel compositions have been found to be particularly useful in the field of transportation and especially in the airplane field. In the airplane field the fuselage and wings of airplanes generally have exterior constructions consisting of wood, ferrous metals and alloys such as stainless steel and the like and in most cases of aluminum and aluminum alloys.

In the practice of this invention, I employ a combination of a plurality of different normally solid copolymers of vinyl chloride and vinyl acetate together with a plasticizer therefor. The various copolymers which may be employed are those containing a major proportion of vinyl chloride therein. These copolymers are generally represented by the chemical formula

$(CH_2CHCl)_x$ $(CH_3COOCHCH_2)_y$

I prefer to employ copolymers having at least 85 parts by weight of the vinyl chloride component $(CH_2CHCl)_y$ to about 15 parts by weight of the vinyl acetate component $(CH_3COOCHCH_2)_y$ and more preferably said copolymers having at least about 90 parts by weight of the vinyl chloride component to about 10 parts by weight of the vinyl acetate component. The ratio by weight of the vinyl chloride component to the vinyl acetate component may be as high as 95 to 5. The various copolymers employed differ from each other in molecular weight and may also differ in the ratio of vinyl chloride component to the vinyl acetate component. It is preferable to employ a combination of a low molecular weight copolymer together with a high molecular weight copolymer. The low molecular weight copolymers which are preferably employed are those having a molecular weight within the range of about 8,000 to 10,000 and the high molecular weight copolymers which are preferably employed are those having a molecular weight greater than about 10,000 and more preferably between about 12,000 and 18,000. The ratio by weight of the low molecular weight copolymer to the high molecular weight polymer is between about 1 to 1 and 5 to 1 and being preferably about 2 to 1. It is preferable that the ratio by weight of vinyl chloride component to the vinyl acetate component in the low molecular weight copolymer be lower than the ratio of the vinyl chloride component to the vinyl acetate component in the high molecular weight copolymer and more preferably these ratios may be about 85 to 15 and 90 to 10 respectively. Also in combination with said copolymers is one or a combination of normally solid acrylic resinous polymers known as methyl methacrylate polymers and methyl acrylate polymers. Of these polymers, I prefer to use those which are solid and have softening points between about 35° C. and 110° C. Those normally solid acrylic resins which I have found particularly useful in the practice of this invention are:

(A) Methyl acrylate polymer—specific gravity 1.10 at 25° C., refractive index 1.490, softening point approximately 35° C. to 55° C.

(B) Methyl methacrylate polymer—specific gravity 1.15 at 25° C., refractive index 1.482, softening point 110° C.

The ratio by weight of said acrylic resin to the combined weights of said copolymers is between about 30 to 100 and 50 to 100 and preferably about 40 to 100.

A solvent for said copolymers and one or more of said acrylic resins may be used, examples of said solvents are the ketones, such as, acetone, methyl ethyl ketone, methyl isobutyl ketone, isophorone and the like and also nitro paraffins, dichlor ethyl ether, di-chlor propyl ether, n-butyl acetate, di-isobutyl ketone, di-methoxytetraglycol, ethyl acetate, ethylene dichloride and isopropyl acetate.

A plasticizer for said copolymers and said polymers may also be used and examples of which are tricresyl phosphate, dioctyl phthalate, triglycol di-2-ethylhexoate and butyrate, methyl, ethyl and butyl esters of acetylated polymerized ricinoleic acids, chlorinated paraffin, chlorinated diphenyl, etc. with the ratio by weight of the combined weights of the copolymers and the acrylic resin to the plasticizer being between about 100 to 20 and 100 to 50 and preferably about 100 to 40.

There also is employed a diluent and if desired an adhesion imparting material. A preferable adhesion imparting material is maleic acid and the quantity preferably employed is such that the ratio by weight of the combined weights of the copolymers to the adhesion imparting substance is within the range of about 500 to 1 and 500 to 3 and is preferably about 500 to 2.

The diluents preferably employed are those liquids which are soluble in the solvents for said polymers and copolymers. The combination of solvent and diluent are so chosen that the boiling points of these two components are within about 20° C. of each other. Some of the diluents which may be employed are toluol, xylol, hexane, heptane and the like.

One of the methods which may be employed to provide my novel compositions in general is as follows: A quantity of a diluent is charged into a vessel and then into said diluent at room temperature there is added a mixture of said solid copolymers of vinyl acetate and vinyl chloride, with the ratio by weight of said diluent to said mixture being between about 50 to 100 and 150 to 100 and preferably about 100 to 100. Said mixture of copolymers preferably consists of a low molecular weight copolymer and a high molecular weight copolymer, with the ratio by weight of the low molecular weight copolymer to the high molecular weight copolymer being between about 1 to 1 and 5 to 1 and the molecular weight of the high molecular weight copolymer being between about 10,000 to 18,000 and with each of said copolymers containing at least about 90 parts of vinyl chloride component and between about 10 to 15 parts of vinyl acetate component for each 90 parts of vinyl chloride component, and preferably with the ratio by weight of the vinyl chloride component to the vinyl acetate component in the low and high molecular weight copolymers being respectively about 85 to 15 and 90 to 10. The mixture of said copolymers is in a finely divided condition as it is added to the diluent. After the addition of said mixture to the diluent, the mass is agitated until the copolymer is substantially uniformly distributed therethrough. Then and while being continuously agitated to maintain this condition the mass is heated and while being heated, there is slowly added thereto a quantity of a solvent for said copolymers, which solvent is also capable of dissolving the aforementioned acrylic resin. The quantity of solvent added is such that the ratio by weight of the solvent to the diluent may be between about 1 to 1 and 2.5 to 1 and preferably about 1½ to 1. During the addition of said solvent there also may be added a small quantity of an adhesion imparting substance, such as maleic acid and the quantity of maleic acid is such that the ratio by weight of maleic acid to the mixture of copolymers in the diluent is between about 1 to 500 and 3 to 500 and preferably about 2 to 500. The mass is continuously heated and agitated during the additions and is further heated and agitated to elevate to the temperature of the mass to between about 150° F. and 200° F. and preferably between about 160° F. and 180° F. This condition is maintained until a substantially clear solution is produced. Besides being agitated by a paddle or like type agitator, the mass may be recirculated until the clear solution is produced. Then to said clear solution maintained at said elevated temperature and constantly agitated and preferably recirculated are added a quantity of plasticizer and also a quantity of the acrylic resin. The plasticizer employed is preferably of liquid nature and is capable of plasticizing the copolymers as well as the acrylic resin polymer and the ratio by weight of plasticizer to the combined weights of the copolymer and the acrylic resin is between about 20 to 100 and 50 to 100 and preferably about 40 to 100. The ratio by weight of the quantity of acrylic resin to the combined weight of the copolymer is between about 30 to 100 and 60 to 100 and preferably 40 to 100. The aforesaid mass being recirculated and agitated is maintained at said elevated temperature until the viscosity of the mass has increased to between about 50 to 60 Krebs units on a Stormer viscometer with a 100 gram weight at 150° F. When said mass has reached the aforesaid viscosity, it may be poured into drums for shipment and is ready for use. If it is desired to impart a particular color to the composition, there may be added any suitable dye or pigmenting agent, such as carbon black, zinc yellow, titanium or the like. The pigment or dye is preferably first compounded with a portion of the acrylic resin on one of said copolymers and is added during the addition of the particular resin employed.

After the mass has been discharged from the vessel, it may be cooled to room temperature and at that temperature is a heavy gummy mass. The mass may have resinous solids content greater than 20% and preferably between about 25% to 50%. The mass may be heated to about 150° F. to 180° F. and at this temperature may be sprayed on the object to be coated. By employing one of said novel compositions whose resinous solids content is greater than 20%, there may be provided coatings which may be produced in a single spraying operation and measuring between .020" and .050". After coating the object with any of these novel compositions, the same may be dried at ordinary or elevated temperatures to provide a substantially dry coating which is of a rubbery nature, is substantially non-oxidizing and non-polymerizable, may be stretched, has good tensile strength, elongation and tear strength characteristics, has very low water absorption and water vapor transmission properties, and may be manually stripped from the coated object. When the adhesion imparting agent, maleic acid is included therein, the coating has good adhesion characteristics, especially to metallic surface, such as aluminum, aluminum alloys and the like and yet it is manually strippable.

The following is a specific example, given by way of illustration and not limitation; of a particular composition made in accordance with this invention and finding particular application as a coating medium for weatherproofing the exterior surface of airplanes against the elements in their trans-ocean shipment. All of the proportions are by weight unless otherwise indicated.

About 2,000 parts of a diluent, which in this instance is xylol, are placed in a vessel and to said diluent are added 1,000 parts of a powdered solid copolymer of vinyl chloride and vinyl acetate known on the market as Vinylite VYHH having a molecular weight of between 8,000 to 10,000 and consisting of about 88 parts vinyl chloride and about 12 parts vinyl acetate, and 500 parts of a powdered copolymer of vinyl chloride and vinyl acetate known on the market as Vinylite VVYNS having a molecular weight of between 12,000 to 18,000 and consisting of about 90 parts vinyl chloride and about 10 parts vinyl acetate. The mix is agitated until a uniform mixture is produced. While still maintained in this condition, the mix is heated slowly while there is added thereto 3,000 parts of methyl isobutyl ketone and 1 part of maleic acid. This mixture is continuously heated and agitated during these additions and it is further heated and agitated to elevate the temperature of the mass to between 160° F. and 180° F. Besides being agitated by a paddle or like agitator, the mass may be recirculated until a clear solution is produced. Then to said clear solution maintained at said elevated temperature constantly agitated and recirculated, are added 240 parts of tricresyl phosphate and 600 parts of dioctyl phthalate and 600 parts of powdered solid methyl methacrylate polymer hereinbefore referred to as (A). The aforesaid mass being recirculated and agitated is maintained at said elevated temperature until the viscosity of the mass has increased to between about 50 to 60 Krebs units on a Stormer viscosimeter with a 100 gram weight at 150° F. When said mass has attained said viscosity, it may be poured into drums and is ready for shipment. If allowed to cool at room temperature, it is a thick, gummy mass. This may be heated to between about 150° F. and 180° F. and generally at 160° F. and in this heated condition is sprayed on to the object to be coated or protected thereby. At said elevated temperature, it may be sprayed on to the exterior surface of airplanes and by a single spraying operation, a coating measuring between .020" and .050" may be obtained. This coating may then be allowed to stand and at ordinary temperatures most of the solvent as well as the diluent evaporate therefrom leaving behind a dry substantially non-tacky coating which is of a rubbery nature, may not be easily scored, has good tensile and tear strength. It is substantially non-oxidizable and non-polymerizable, has excellent resistance to water absorption as well as to water vapor transmission, has good co-adhesion characteristics, has good adhesion characteristics, and at the same time may be manually stripped from the surface being protected. After the coating has been stripped from the surface to be protected, it will be found to be smooth, continuous, and non-porous.

I claim:

1. A composition comprising (a) a copolymer of vinyl chloride and vinyl acetate having a molecular weight between 8,000 and 10,000, (b) a copolymer of vinyl chloride and vinyl acetate having a molecular weight between 12,000 and 18,000 and having a greater percentage of vinyl chloride than (a), the percentage of vinyl acetate in each of said copolymers being between 5% and 15% and the ratio of (a) to (b) being between 1 to 1 and 5 to 1, (c) a solid acrylic resin selected from the group consisting of polymeric methyl methacrylate and polymeric methyl acrylate, said acrylic resin having a melting point between 35° C. and 110° C., the ratio by weight of (c) to the combined weights of (a) and (b) being between 30 to 100 and 50 to 100, (d) a solvent for (a), (b), and (c); (e) a plasticizer for (a), (b), and (c), and (f) a diluent.

2. A composition comprising (a) a copolymer of vinyl chloride and vinyl acetate having a molecular weight between 8,000 and 10,000; (b) a copolymer of vinyl chloride and vinyl acetate having a molecular weight between 12,000 and 18,000 and having a greater percentage of vinyl chloride than (a), the vinyl chloride component of each of said (a) and (b) being at least 85% by weight of the respective (a) and (b), the percentage of vinyl acetate in each of said (a) and (b) being between 10% and 15% and the ratio of (a) to (b) being between 1 to 1 and 5 to 1; (c) a solid acrylic resin selected from the group consisting of polymeric methyl methacrylate and polymeric methyl acrylate, said acrylic resin having a softening point between 35° C. and 110° C.; (d) a solvent for (a), (b) and (c); (e) a plasticizer for (a), (b) and (c); and (f) a diluent, the ratio by weight of the combined weights of (a) and (b) to (c) being between 100 to 30 and 100 to 50, and the ratio by weight of said diluent to the combined weights of (a) and (b) being between 50 to 100 and 150 to 100.

3. A method for temporarily protecting a surface which comprises applying to said surface to be protected, a layer of a composition comprising (a) a copolymer of vinyl chloride and vinyl acetate having a molecular weight between 8,000 and 10,000; (b) a copolymer of vinyl chloride and vinyl acetate having a molecular weight between 12,000 and 18,000 and having a greater percentage of vinyl chloride than (a), the percentage of vinyl acetate in each of said copolymers being between 5% and 15% and the ratio of (a) to (b) being between 1 to 1 and 5 to 1; (c) a solid acrylic resin selected from the group consisting of polymeric methyl methacrylate and polymeric methyl acrylate, said acrylic resin having a melting point between 35° C. and 110° C., the ratio by weight of (c) to the combined weights of (a) and (b) being between 30 to 100 and 50 to 100; (d) a solvent for (a), (b) and (c); (e) a plasticizer for (a), (b) and (c); and (f) a diluent, and evaporating most of the solvent and diluent from said layer to provide a coating which is substantially non-tacky and of a rubbery nature and resistant to water adsorption as well as water vapor transmission.

ANDREW R. FORGIE.

REFERENCES CITED

The following references are of record in the file of this patent:

UNITED STATES PATENTS

| Number | Name | Date |
|---|---|---|
| 2,031,673 | Schneider et al. | Feb. 25, 1936 |
| 2,215,340 | Vasen | Sept. 17, 1940 |
| 2,245,708 | Patton | June 17, 1941 |
| 2,299,433 | Stoner | Oct. 20, 1942 |
| 2,311,249 | Powell | Feb. 16, 1943 |
| 2,315,503 | Crowell et al. | Apr. 6, 1943 |
| 2,333,887 | Redlinger | Nov. 9, 1943 |
| 2,394,418 | Quattlebaum et al. | Feb. 5, 1946 |
| 2,396,125 | Price | Mar. 5, 1946 |
| 2,439,395 | Leatherman | Apr. 13, 1948 |